United States Patent Office 3,214,421
Patented Oct. 26, 1965

3,214,421
CURING TERMINALLY REACTIVE POLYMERS
WITH AGENTS OF MIXED FUNCTIONALITY
John E. Mahan, Bartlesville, Okla., assignor to Phillips Petroleum Company, a corporation of Delaware
No Drawing. Filed Feb. 6, 1961, Ser. No. 87,126
The portion of the term of the patent subsequent to July 9, 1980, has been disclaimed and dedicated to the Public
12 Claims. (Cl. 260—94.7)

This invention relates to a method of curing terminally reactive polymers and to the resulting product. In another aspect it relates to a method of controlling the degree of cure of polymers having terminally reactive groups by employing curing agents of mixed functionality.

In the development of curing agents for elastomers it has been the general endeavor to produce polymers that are tightly cured, that is, with a high amount of cross-linking. Such polymers exhibit a high degree of elasticity and tensile strength. These polymers are rather intractable, however, and do not lend themselves readily to certain uses such as caulking compounds and foamed products, e.g., for insulation or cushioning material. In these uses the polymer, prior to curing, must possess a rather high degree of fluidity. This is particularly true of foams in which gas bubbles must be evenly dispersed. It is desirable, therefore, that methods be developed for curing such polymers to a given degree or extending the curing time to permit working the polymer in a partially cured state. It is also desirable that properties of resilience and tensile strength be obtained after curing which are reasonably constant at low temperatures.

According to my invention a novel curing method is provided which enables controlling the degree of cross-linking obtained when curing polymers which are terminally reactive with the curing agent. My invention comprises curing a polymer of a vinylidene-containing monomer, said polymer containing at least 2 terminally positioned acidic groups per molecule, with a combination of agents which include a diaziridinyl compound and polyaziridinyl compound. By varying the ratios of the di- and polyaziridinyl compounds one is enabled to control time of curing and the degree of curing obtained. The invention thereby provides great flexibility in the fabrication of materials employing these terminally reactive polymers. In this disclosure and in the claims by the term "polyfunctional" I mean reactants with more than two functional groups per molecule, for example, 3–6 or more functional groups per molecule.

It is an object of this invention to provide a method of curing polymers containing terminally reactive acidic groups. Another object of the invention is to provide improved elastomeric compositions which have been cured with a combination of di-and polyfunctional curing agents. Still another object is to provide a method of controlling the degree of cross-linking and the time for curing terminally reactive polymers by varying the ratio of di- and polyfunctional compounds employed for the curative. Other objects, advantages and features of my invention will be apparent to those skilled in the art from the following disclosure.

Highly useful polymeric products can be obtained by polymerizing vinylidene-containing monomers in the presence of an organo alkali metal catalyst and subsequently reacting the resulting polymer containing active alkali metal end groups with a reagent which will replace these alkali metal groups with acidic groups. These polymers which contain terminal acidic groups can then be cured by reaction with polyaziridinyl compounds.

The polymers which contain terminally reactive alkali metal atoms can be prepared from a wide variety of monomers. The preferred monomers are the conjugated dienes containing from 4 to 12 carbon atoms per molecule and preferably 4 to 8 carbon atoms per molecule. Examples of these compounds include the following; 1,3-butadiene, isoprene, 2,3-dimethyl-1,3-butadiene, 1,3-3-methyl-1,3-pentadiene, 2-methyl-3-ethyl-1,3-pentadiene, 3-methyl-1,3-pentadiene, 2-methyl-3-ethyl1-,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1-,3-butadiene, 2,3-diethyl-1,3-butadiene, 2,3-di-n-propyl-1,3-butadiene, 2-methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers Block copolymers can be prepared from two or more conjugated dienes by charging one compound initially, allowing it to polymerize, and then adding a second conjugated diene and allowing it to polymerize. It is preferred that conjugated diolefins be employed in the practice of our invention and preferred monomers are butadiene, isoprene and piperylene.

In addition to the conjugated dienes I can practice my invention with other monomers containing a $CH_2=C<$ group such as the vinyl-substituted aromatic compounds. The vinyl-substituted aromatic compounds include styrene, 1-vinylnaphthalene, 2-vinylanphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include:

3-methylstyrene (3-vinyltoluene)
3,5-diethylstyrene
4-n-propylstyrene
2,4,6,-trimethylstyrene
4-dodecylstyrene
3-methyl-5-n-hexylstyrene
4-cyclohexylstyrene
4-phenylstyrene
2-ethyl-4-benzylstyrene
4-p-toylstyrene
3,5-diphenylstyrene
2,4,6,tri-tert-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decoxystyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6,-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene 7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phneyl-n-propyl)-2-vinylnaphthalene
4-methoxy-1-vinylnaphthalene
6-phenoxy-1-vinylnaphthalene
3,6-dimethylamino-1-vinylnaphthalene
7-dihexoxy-2-vinylnaphthalene and the like. These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form homopolymers of copolymers with each other. These polar monomers can be employed to form block copolymers with conjugated dienes and/or vinyl-substituted aromatic compounds. When preparing these block copolymers the polar monomer is introduced after the nonpolar monomers have polymerized. A detailed description of block copolymers containing terminal reactive groups and their method of preparation is set forth in the copending application of R. P. Zelinski, Serial No. 796,277, March 2, 1959, now abandoned. These polar monomers include vinylpyridines and vinylquinolines in which the vinyl group is atached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include:

2-vinylpyridine
4-vinylpyridine
3,5-diethyl-4-vinylpyridine
5-methyl-2-vinylpyridine
5-n-octyl-2-vinylpyridine
3-n-dodecyl-2-vinylpyridine
3,5-di-n-hexyl-4-vinylpyridine
5-cyclohexyl-2-vinylpyridine
4-phenyl-2-vinylpyridine
3,5-di-tert-butyl-2-vinylpyridine
3-benzyl-4-vinylpyridine
6-methoxy-2-vinylpyridine
4-phenoxy-2-vinylpyridine
4-dimethylamino-2-vinylpyridine
3,5-dimethyl-4-diamylamino-2-vinylpyridine
2-vinylquinoline
4-vinylquinoline
2-tert-butyl-4-vinylquinoline
3-methyl-4-vinylquinoline
3-cyclohexyl-4-vinylquinoline
3-methyl-4-ethoxy-2-vinylquinoline
1-vinylisoquinoline
3-vinylisoquinoline
4-tert-dodecyl-1-vinylisoquinoline
2-dimethylamino-3-vinylisoquinoline
4-benzyl-3-vinylisoquinoline
4-phenyl-1-vinylisoquinoline and the like Other polar monomers include acrylic and alkacrylic acid esters, nitriles, and N,N-disubtituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide and the like. Vinylfuran and N-vinylcarbazole can also be used.

The terminally reactive polymers are prepared by contacting the monomer or monomers which it is desired to polymerize with an organo alkali metal compound. The organo alkali metal compounds preferably contain from 2 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of akali metals to a double bond, or by reacting an organic halide with a suitable alkali metal compound.

The organo alkali metal compound initiates the polymerization reaction, the organo radical being incorporated in the polymer chain and the alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 2 to 4.

The organo alkali metal initiators employed for preparing the polymers used in our invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 2 to 4. The R in the formula generally contains from 1 to 20 carbon atoms although it is within the scope of the invention to use higher molecular weight compounds. By far the best results are obtained with organo lithium compounds which give very high conversions to the terminally reactive polymer. Lithium is, therefore, the preferred alkali metal for the polymerization initiator. Examples of polyalkali metal substituted hydrocarbons which can be employed for the polymerization initiator include 1,4-dilithiobutane,
1,5-dipotassiopentane,
1,4-disodio-2-methylbutane,
1,6-dilithiohexane,
1,10-dilithiodecane,
1,15-dipotassiopentadecane,
1,20-dilithioeicosane,
1,4-disodio-2-butene,
1,4-dilithio-2-methyl-2-butene,
1,4-dilithio-2-butene,
1,4-dipotassio-2-butene,
dilithionaphthalene,
disodionaphthalene,
4,4′-dilithiobiphenyl,
disodiophenanthrene,
dilithioanthracene,
1,2-dilithio-1-1-diphenylethane,
1,2-disodio-1,2,3-triphenylpropane,
1,2-dilithio-1,2-diphenylethane,
1,2-dipotassiotriphenylethane,
1,2-dilithiotetraphenylethane,
1,2-dilithio-1-phenyl-1-naphthylethane,
1,2-dilithio-1,2-dinaphthylethane,
1,2-disodio-1,1-diphenyl-2-naphthylethane,
1,2-dilithiotrinaphthylethane,
1,4-dilithiocyclohexane,
2,4-disodioethylcyclohexane,
3,5-dipotassio-n-butylcyclohexane,
1,3,5-trilithiocyclohexane,
1-lithio-4-(2-lithiomethylphenyl)butane,
1,2-dipotassio-3-phenylpropane,
1,2-di(lithiobutyl)benzene,
1,3-dilithio-4-ethylbenzene,
1,4-dirubidiobutane,
1,8-dicesiooctane,
1,5,12-trilithiododecane, 1,4,7-trisodioheptane,
1,4-di(1,2-dilithio-2-phenylethyl)benzene,
1,2,7,8-tetrasodionaphthalene,
1,4,7,10-tetrapotassiodecane,
1,5-dilithio-3-pentyne,
1,8-disodio-5-octyne,
1,7-dipotassio-4-heptyne,
1,10-dicesio-4-decyne,
1,11-dirubidio-5-hendecyne,
1,2-disodio-1,2-diphenylethane,
dilithiophenanthrene,
1,2-dilithiotriphenylethane,
1,2-disodio-1,2-diphenylethane,
dilithiomethane,
1,4-dilithio-1,1,4,4-tetraphenylbutane,
1,4-dilithio-1,4-diphenyl-1,4-dinaphthylbutane and the like.

Certain specific initiators give better results than others and are preferred in carrying out preparation of the terminally reactive polymers. Lithium adducts of naphthalene, methylnaphthalenes, and anthracene give very good results. A preferred initiator is 1,2-dilithio-1,2-diphenylethane (lithium-stilbene adduct). Other preferred initiators for the formation of telechelic polymers are the dilithium adducts of 2,3-dialkyl-1,3-butadiene, e.g., 2,3-dimethyl-1,3-butadiene, and especially the dilithium adducts of isoprene and 1,3-butadiene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semisolid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent which is predominantly hydrogen, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per moleclue. It should be understood that relatively small amounts of other materials can be present, such as the ethers in which the initiator was dissolved, or a polar compound which is charged to encourage random copolymerization. As stated previously, the organolithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures.

The terminally reactive polymers prepared as hereinbefore set forth contain an alkali metal atom on each end of the polymer chain and the organic radical of the initiator is present in the polymer chain. These terminally reactive polymers are treated with suitable reagents such as carbon dioxide, sulfuryl chloride, etc., and upon hydrolysis provide polymers containing terminal acidic groups. The acidic groups include groups such as $SOH$, $SO_2H$, $SO_3H$, $COOH$, $SeO_2H$, $SeO_3H$, $SiO_2H$, $SnO_2H$, $SbO_2H$, $SbOH$, $SbO_3H$, $TeO_2H$, $TeO_3H$, $AsO_2H$, $AsOH$, $AsO_3H_2$, and $AsO_3H_3$. Reaction of terminally reactive polymer containing alkali metal atoms with the acid forming reagents can be carried out over a wide range of temperatures, e.g., —75° C. to +75° C., and preferably utilizing an amount of reagent in excess of stoichiometric. The following reactions present examples of specific methods which can be employed to introduce the terminal acidic groups. In these equations, A designates a polymer chain.

(1)

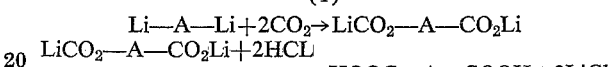

(2)

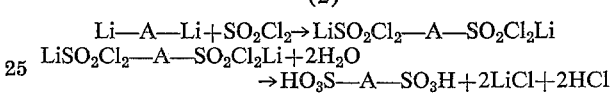

The polyfunctional curing agents used in my invention include compounds containing at least three aziridinyl groups and preferably either three or six aziridinyl groups per molecule. For example, typical of such polyfunctional compounds are tri(aziridinyl)phosphine oxides or sulfides which are represented by the formula:

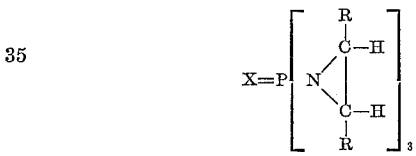

wherein X is selected from the group consisting of oxygen and sulfur, P is phosphorous, the R's are radicals containing up to a total of 20 carbon atoms selected from the group consisting of hydrogen, alkyl, cycloalkyl, aryl, alkaryl and aralkyl radicals and the R's can be unlike. Specific phosphine reactants which can be used include tri(1-aziridinyl)phosphine oxide, tri(2-methyl-1-aziridinyl)phosphine oxide,
tri(2,3-dimethyl-1-aziridinyl)phosphine oxide,
tri(2-isopropyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl-3-n-butyl-1-aziridinyl)phosphine oxide,
tri(2-hexyl-1-aziridinyl)-phosphine oxide,
tri(2,3-diheptyl-1-aziridinyl)phosphine oxide,
tri(2-methyl-3-octyl-1-aziridinyl)phosphine oxide,
tri(2-ethyl-3-decyl-1-aziridinyl)phosphine oxide,
tri(2-dodecyl-1-aziridinyl)phosphine oxide,
tri(2-methyl-3-tridecyl-1-aziridinyl)phosphine oxide,
tri(2-ethyl-3-octadecyl-1-aziridinyl)phosphine oxide,
tri(2-eicosyl-1-aziridinyl)phosphine oxide,
tri(2-methyl-3-cyclopentyl-1-aziridinyl)phosphine oxide,
tri(2-ethyl-3-cyclohexyl-1-aziridinyl)phosphine oxide,
tri[2 - n - butyl-3-(4-methylcyclohexyl)1-aziridinyl] phosphine oxide,
tri(2-phenyl-1-aziridinyl)phosphine oxide,
tri(2-phenyl-3-tetradecyl-1-aziridinyl)phosphine oxide,
tri(2,3 - diphenyl-1-aziridinyl)phosphine oxide,
tri(2-tert-butyl-3-phenyl-1-aziridinyl)phosphine oxide,
tri[2-ethyl-3-(1-naphthyl)1-aziridinyl]phosphine oxide,
tri[2 - n - propyl - 3 - (2-naphthyl)1-aziridinyl]phosphine oxide,
tri(2-methyl-3-benzyl-1-aziridinyl)phosphine oxide,
tri(2-nonyl-3-benzyl-1-aziridinyl)phosphine oxide,
tri[2 - n - propyl-3-(2-phenylethyl)1-aziridinyl]phosphine oxide, tri[2 - methyl - 3-(4-methylphenyl) 1-aziridinyl]phosphine oxide,
tri[2 - ethyl - 3-(3-n-propylphenyl) 1-aziridinyl]phosphine oxide,
tri[2 - heptyl - 3-(2,4-dimethylphenyl) 1-aziridinyl]phosphine oxide,
tri(1-aziridinyl)phosphine sulfide,
tri(2-methyl-1-aziridinyl)phosphine sulfide,
tri(2,3-dimethyl-1-aziridinyl)phosphine sulfide,
tri(2,3-diethyl-1-aziridinyl)phosphine sulfide,
tri(2-methyl-3-isopropyl-1-aziridinyl)phosphine sulfide,
tri(2-tert-butyl-1-aziridinyl)phosphine sulfide,
tri(2,3-didecyl-1-aziridinyl)phosphine sulfide,
tri(2-ethyl-3-pentadecyl-1-aziridinyl)phosphine sulfide,
tri(2-eicosyl-1-aziridinyl)phosphine sulfide,
tri(2-methyl-3-cyclohexyl-1-aziridinyl)phosphine sulfide,
tri(2-phenyl-1-aziridinyl)phosphine sulfide,
tri(2-phenyl-3-benzyl-1-aziridinyl)phosphine sulfide,
tri(2,3-diphenyl-1-aziridinyl)phosphine sulfide,
tri(2-ethyl-3-phenyl-1-aziridinyl)phosphine sulfide, and
tri(2-amyl-3-benzyl-1-aziridinyl)phosphine sulfide.

Examples of other polyfunctional aziridinyl compounds are the aziridinyl-substituted triazines and triphosphatriazines, for example, the 1-aziridinyl-1,3,5-triazines and the 1 - aziridinyl - 2,4,6-triphospha-1,3,5-triazines represented by the formulas:

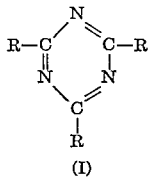

(I)

and

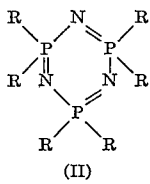

(II)

wherein R is a radical selected from the group consisting of a 1-aziridinyl radical which can be represented by the formula:

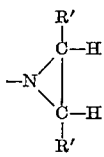

hydrogen, an alkyl, cycloalkyl, aryl, aralkyl, and alkaryl radical, each hydrocarbon radical containing from 1 to 12 carbon atoms, and the R' radicals are selected from the group consisting of hydrogen, alkyl, cycloalkyl, aryl, aralkyl, and alkaryl radicals, and R' can be alike or different, the R"s in each aziridinyl radical containing up to and including a total of 20 carbon atoms. In the foregoing formulas, at least three of the R groups are 1-aziridinyl radicals. Thus, each of the R groups in Formula I is an aziridinyl radical.

Examples of the compounds represented by Formula I are:
2,4,6-tri(1-aziridinyl)-1,3,5-triazine
2,4,6-tri(2-methyl-1-aziridinyl)-1,3,5-triazine
2,4,6-tri(2-methyl-3-ethyl-1-aziridinyl)-1,3,5-triazine
2,4,6-tri(2-ethyl-3-octadecyl-1-aziridinyl)-1,3,5-triazine
2,4,6 - tri(2 - methyl - 3 - cyclopentyl-1-aziridinyl)-1,3,5-triazine
2,4,6-tri(2-phenyl-1-aziridinyl)-1,3,5-triazine
2,4,6-tri(2,3-diphenyl-1-aziridinyl)-1,3,5-triazine
2,4,6 - tri(2-n-propyl-3-(2-phenylethyl) 1-aziridinyl)-1,3,5-triazine
2,4,6 - tri(2-methyl-3-(4-methylphenyl) 1-aziridinyl)-1,3,5-triazine
and the like.

Examples of compounds represented by Formula II include the following:
2,4,6-tri(1-aziridinyl)2,4,6-triphospha-1,3,5-triazine
2,4,6 - tri(2 - methyl-3-n-butyl-1-aziridinyl)-2,4,6-triphospha-1,3,5-triazine
2,4,6 - tri(2-ethyl-3-cyclohexyl-1-aziridinyl)-2,4,6-triphospha-1,3,5-triazine
2,4,6 - tri(2-n-propyl-3-(2-phenylethyl)-1-aziridinyl)2,4,6-triphospha-1,3,5-triazine
2,4,6 - tri(2 - heptyl-3-(2,4-dimethylphenyl)-1-aziridinyl) 2,4,6-triphospha-1,3,5-triazine
2,2,4,4,6,6 - hexa(2-methyl-1-aziridinyl)-2,4,6,triphospha-1,3,5-triazine, hereinafter referred to as hexa-2-methyl-1-aziridinyltriphosphatriazine
2,2,4,6 - tetra(2 - hexyl - 1 - aziridinyl) - 2,4,6-triphospha-1,3,5-triazine
and the like.

The difunctional aziridinyl compounds which are employed in the combined curative system of this invention are defined by the formula

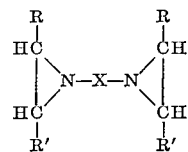

wherein X is selected from the group consisting of carbonyl, phenyl phosphoryl, phenyl thiophosphoryl, sulfoxyl or sulfonyl and each R and R' is hydrogen or an alkyl group containing from 1 to 4 carbon atoms. In the preferred species X is phenyl phosphoryl or sulfoxyl, R is hydrogen and R' is methyl. Examples of suitable difunctional aziridinyl compounds are:

phenyl-bis(2-methyl-1-aziridinyl)phosphine sulfide,
phenyl-bis(2-methyl-1-aziridinyl)phosphine oxide,
phenyl-bis(2-ethyl-1-aziridinyl)phosphine oxide,
phenyl-bis(2-methyl-3-ethyl-1-aziridinyl)phosphine oxide,
phenyl-bis(2-butyl-1-aziridinyl)phosphine oxide,
bis(2-methyl-1-aziridinyl)sulfoxide,
bis(2-propyl-1-aziridinyl)sulfoxide,
bis(2-methyl-3-propyl-1-aziridinyl)sulfoxide,
(2-methyl-1-aziridinyl-2'-butyl-1-aziridinyl)sulfoxide,
bis(1-aziridinyl)sulfone,
bis(2-methyl-1-aziridinyl)sulfone,
bis(2-ethyl-1-aziridinyl)sulfone,
bis(2-propyl-1-aziridinyl)sulfone,
bis(2-ethyl-3-propyl-1-aziridinyl)sulfone,
(2-methyl-1-aziridinyl-2'-ethyl-1-aziridinyl)sulfone,
bis(1,2-propylene)-1,3-urea,
bis(1,2-pentylene)-1,3-urea,
bis(4,5-octylene)-1,3-urea,
and the like.

In general, the curing agents comprise from 10 to 90 percent difunctional compounds and preferably from 30 to 70 percent of the curing agent will be the difunctional aziridinyl compound. The total amount of curative used is preferably about stoichiometric to somewhat above stoichiometric, for example, about 125 percent of the stoichiometric amount of curative based upon the acid equivalents of the polymer. A large excess of the aziridinyl compound (150 to 200 percent of the equivalent weight) gives the best results in black filled stocks.

Operating according to my invention liquid polymers can be converted to elastomeric products. The products range from soft, tacky materials to tightly cured stocks. Fillers such as carbon black or inorganic minerals such as silica, titanium dioxide or clay can be incorporated into the polymer if desired. Polymers can be compounded with the curing agents and carbon black or other fillers in the conventional manner using a roll mill or a Banbury mixer. Where fluidity is desired before the final cure all of the ingredients, terminally reactive polymer, curing agents, and the filler can be mixed in a dispersant-type mixer with evacuation, placed in a mold and cured by heating. Instead of molding the mixture can be injected into cracks as in caulking operations or used as adhesives for laminations, before curing. Where spongy products are desired a gasing agent is added just before molding. The gas generation generally takes place during the curing step and under these circumstances the mix does not completely fill the mold after the time of transfer. One suitable method involves forming a "preadduct" which is prepared by adding the difunctional aziridinyl compound to the polymer admixture and precuring this mixture before incorporating the polyfunctional aziridinyl compound. Curing temperatures can range anywhere between 100 and 400° F., but preferably are not greater than 300° F. In preparing stocks reinforced with carbon black a final curing temperature of 250° F., or slightly below, is most desirable. The resulting products can be used as adhesives, potting compounds, sealants, and for making many types of molded and foamed objects.

The advantages of my invention are demonstrated by the following examples in which specific conditions and materials are presented as typical and should not be construed to limit my invention unduly.

EXAMPLE I

Polybutadiene containing terminal carboxy groups which had been prepared by polymerizing butadiene in the presence of an organo dilithium catalyst and converting the resulting product to the carboxy containing polymer by contact with carbon dioxide was cured as follows. The polymer had a carboxy content of 1.03 percent and the molecular weight was approximately 10,000. A preadduct was prepared by degassing the terminally reactive polymer by evacuating at 230° F. for two hours, after which a curing agent was stirred in and the mixture was heated at 230° F. for various lengths of time as indicated in the table. The polymer was then removed to a 2 inch roll mill and carbon black and more curing agent were added. All the samples were cured between thin sheets of aluminum. In the runs of Example I the polymer was first cured partially for 30 minutes at 230° F. with 60 equivalent weight percent of hexa-2-methylaziridinyl triphosphatriazine. The partially cured polymer was then milled with 50 phr of a high abrasion furnace black (Philblack O) and cured for 60 minutes at approximately 240° F. Properties of the cured product are shown in the table.

EXAMPLE II

The polymer employed in Example I was partially cured for 16 hours at 230° F. with bis[1-(2-methyl)aziridinyl]-phenyl phosphine oxide after degassing under vacuum. These preadducts were then mixed on the roll mill with 100 equivalent weight percent of the hexafunctional aziridinyl compound used in Example I and 50 phr of the high abrasion furnace black. Then the products were cured for 60 minutes at 235° F. The properties of the cured products are shown in the table.

*Table I*

| | Preadduct Formation | | Final Cure | | | Elongation, percent | Inverse Swelling Ratio [4] |
|---|---|---|---|---|---|---|---|
| | Curing Agent, Eq. Wt. percent | Time at 230 F., Hours | Curing Agent Added, Eq. Wt. percent [1] | Total, Eq. Wt. percent | Cure Temperature,[3] F. | | |
| Example I | [1] 60 | 0.5 | 50 | 110 | 240 | 120 | 0.364 |
| | [1] 60 | 0.5 | 100 | 160 | 240 | 140 | 0.375 |
| | [1] 60 | 0.5 | 150 | 210 | 240 | 120 | 0.399 |
| | [1] 60 | 0.5 | 100 | 160 | 235 | 160 | 0.377 |
| Example II | [2] 43 | 16 | 100 | 143 | 235 | 210 | 0.307 |
| | [2] 33 | 16 | 100 | 133 | 235 | 170 | 0.340 |

[1] Hexa-2-methyl aziridinyl triphosphatriazine.
[2] Bis[1-(2-methyl)aziridinyl]phenylphosphine oxide.
[3] Curing time was sixty minutes.
[4] Defined as the volume of polymer divided by the combined volume of rubber and solvent (n-heptane).

As shown by the above data the invention involving the combination of di- and poly-functional curing agents can be employed to vary time for cure and the degree of cross-linking in the polymer to obtain products of substantially higher elongation than can be obtained by simply decreasing the amount of polyfunctional curing agent. It can, therefore, be seen that according to the method of my invention considerable flexibility in fabrication is provided and products can be tailored to meet specific uses simply by varying the proportions of di- and poly-functional curative used to effect the final cure of the polymeric products.

As will be apparent to those skilled in the art from the above disclosure various modifications can be made in my invention without departing from the spirit or scope thereof. For example, the terminally reactive polymer can be cured in admixture with similar polymeric material which does not contain two acidic groups per molecule. Blends of difunctional and nonfunctional polymer can be successfully cured as described. In general, in the total polymeric material at least 50 percent and preferably at least 75 percent of the molecules should each contain two or more acidic groups. I intend to include such mixtures within the scope of my claimed invention.

I claim:

1. A method of curing a polymer of a vinylidene-containing monomer, at least 50 percent of the molecules of said polymer containing at least 2 terminally positioned acidic groups containing oxygen, hydrogen and an element selected from the group consisting of sulfur, carbon, selenium, silicon, tin, antimony tellurium and arsenic, which comprises reacting said polymer with a difunctional aziridinyl compound and a polyfunctional aziridinyl compound.

2. A method of curing a polymer in which at least 50 percent of the molecules contain 2 terminally positioned acidic groups containing oxygen, hydrogen and an element selected from the group consisting of sulfur, carbon, selenium, silicon, tin, antimony, tellurium and arsenic, said polymer being a polymerizate of conjugated dienes containing from 4–12 carbon atoms per molecule which comprises reacting said polymer with a difunctional aziridinyl compound having the formula:

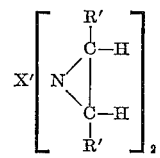

wherein X' is selected from the group consisting of carbonyl, phenyl phosphoryl, phenyl thiophosphoryl, sulfoxyl, and sulfonyl, and each R' is selected from the group consisting of hydrogen and alkyl radicals of 1 to 4 carbon atoms, and a polyfunctional compound containing at least three 1-aziridinyl groups.

3. A method of curing a polymer in which at least 50 percent of the molecules contain 2 terminally positioned carboxy groups, said polymer being a polymerizate of conjugated dienes containing from 4–12 carbon atoms per molecule, which comprises reacting said polymer with a difunctional aziridinyl compound having the formula:

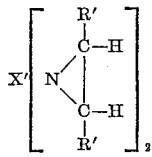

wherein X' is selected from the group consisting of carbonyl, phenyl phosphoryl, phenyl thiophosphoryl, sulfoxyl, and sulfonyl, and each R' is selected from the group consisting of hydogen and alkyl radicals of 1 to 4 carbon atoms, and a polyfunctional aziridinyl compound selected from the group consisting of 1-aziridinyltriazine, 1-aziridinyltriphosphatriazine, and tri-functional compounds having the formula:

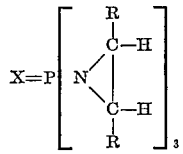

wherein X is selected from the group consisting of oxygen and sulfur, P is phosphorus, and each R is selected from the group consisting of hydrogen, alkyl, cycloalkyl, aryl, alkaryl, and aralkyl radicals, both R's containing up to a total of 20 carbon atoms, said reacting being effected at a temperature in the range of 100 to 300° F.

4. The method of claim 3 wherein said polymer is polybutadiene containing carboxy groups on each end of the polymer molecule, said difunctional aziridinyl compound is bis[1-(2-methyl)aziridinyl]phenyl phosphine oxide and said polyfunctional aziridinyl compound is hexa-2-methyl aziridinyl triphosphatriazine.

5. The method of claim 3 wherein said polymer is a butadiene-styrene copolymer containing terminal carboxy groups, said difunctional aziridinyl compound is bis(1-2-propylene)-1,3-urea and said polyfunctional aziridinyl compound is tri(2-methyl-1-aziridinyl)phosphine oxide.

6. The method of claim 3 wherein said polymer is cured in two stages, initially with said difunctional aziridinyl compound and finally with said polyfunctional aziridinyl compound.

7. An elastomeric composition prepared according to the method of claim 1.

8. An elastomeric composition prepared according to the method of claim 3.

9. Elastomeric polybutadiene prepared according to the method of claim 4.

10. A method of curing a polymer of a vinylidine-containing monomer, at least 50 percent of the molecules of said polymer containing at least 2 terminally positioned carboxy groups, which comprises reacting said polymer with a difunctional aziridinyl compound and a polyfunctional aziridinyl compound.

11. A method of curing a polymer of a vinylidine-containing monomer, at least 50 percent of the molecules of said polymer containing at least 2 terminally positioned carboxy groups, which comprises first reacting said polymer with a difunctional aziridinyl compound to form a preadduct and thereafter reacting said preadduct with a polyfunctional aziridinyl compound.

12. A method of curing polybutadiene in which at least 50 percent of the molecules contain 2 terminally positioned carboxy groups, which comprises first reacting said polymer with bis[1-(2-methyl)aziridinyl]phenyl phosphine oxide as a difunctional curing agent to form a preadduct and thereafter reacting said preadduct with hexa-2-methyl aziridinyl triphosphatriazine as a polyfunctional curative, the total amount of di- and polyfunctional curative being in the range of about stoichiometric to 150 percent of stoichiometric based on the carboxy content of the polymer, said difunctional agent being about 30 to 70 percent of said total curative.

References Cited by the Examiner
UNITED STATES PATENTS

| | | | |
|---|---|---|---|
| 2,915,480 | 12/59 | Reeves et al. | 260—2 |
| 2,933,416 | 4/60 | Haakh et al. | 260—29.2 |
| 2,962,479 | 11/60 | Aldridge et al. | 260—73 |
| 3,097,193 | 7/63 | Gruver | 260—94.7 |

OTHER REFERENCES

Morton et al.: J.A.C.S., January 1946, vol. 68, pages 93–95.

JOSEPH L. SCHOFER, *Primary Examiner.*

MORRIS LIEBMAN, JAMES A. SEIDLECK, *Examiners.*